United States Patent Office 3,129,106
Patented Apr. 14, 1964

3,129,106
WETTING AND ANTI-STRIPPING ALIPHATIC ETHER AND POLYAMINE CHAIN COMPOUNDS FOR USE IN CONNECTION WITH ASPHALT COMPOSITIONS
Jacob Katz, 15 Bevelin Road, Providence, R.I.
No Drawing. Filed May 3, 1960, Ser. No. 26,425
11 Claims. (Cl. 106—273)

The present invention relates to asphalt compositions and additives therefor.

The present invention is particularly directed to asphalt compositions and asphalt emulsion compositions and is also directed to novel wetting and anti-stripping agents for use in such compositions.

An object of the present invention is to provide a new class of wetting and anti-stripping agents for use in bituminous paving materials and particularly in connection with asphalts, asphalt emulsions and tars, which will assure adherence of these asphalt or tarry materials to various types of aggregates.

Another object is to provide novel asphalt and bituminous combinations which will coat and adhere to wet or dry aggregates, whether of granite or other siliceous nature and regardless of their acid or basic surface qualities and which will provide a durable long lasting adhesive bond without special processing and with the use of minimum quantities of the additive anti-stripping or wetting agent.

A further object is to provide bituminous asphalt or tarry compositions for adherrence to aggregate which will not be subject to decomposition or loss of wetting and anti-stripping properties with prolonged heating or when subject to elevated temperatures ranging from 250° to 400° F. and which will have undiminished high wetting and anti-stripping properties over long periods of time.

Still further objects and advantages will appear in the more detailed description set forth below, it being understood, however, that this more detailed description is given by way of illustration and explanation only and not by way of limitations, since various changes therein may be made by those skilled in the art without departing from the scope and spirit of the present invention.

It has now been found that unusually effective wetting and anti-stripping agents which are stable over long periods of time and at elevated temperatures of 250° to 400° F. may be prepared by the reaction of nitrogenous polyamino alkoxy aliphatic compounds with high molecular weight fatty acids.

The polyamino alkoxy compounds contain at least one primary or secondary amino group, at least one tertiary amino group, which will act as a salt former, and an ether linkage.

Under reactive conditions with the fatty acids, the primary or secondary amine group form an amide with the fatty acid, and the tertiary amine group form a fatty acid salt with the fatty acid, with the ether linkage imparting the required surface tension properties such that a balanced hydrophobic-hydrophilic compound results suitable for use as a wetting and anti-stripping agent in asphalts, tars and the like.

The preferred polyamino compounds are the following:
The compounds are of the formulae

and

where R, R$_1$, R$_2$, X and Y are alkyl groups having 1 to 5 carbon atoms.

The preferred compounds are:

Dimethylaminoethoxypropylamine
Diethylaminoethoxypropylamine
Di-(diethylaminoethoxypropyl)-amine In the preferred relationship of carboxy groups to amino groups, there should be at least one mol of fatty acid for each salt forming tertiary nitrogenous group.

Desirably, where the above amine contains more than one tertiary nitrogenous group, it is not necessary to use a total amount of fatty acid as would form a salt with each tertiary group therein, but it is sufficient that there be at least two mols of fatty acid per mol of polyamine.

In producing the above alkoxy amines, the corresponding dialkylaminoalkoxy-alkylnitrile is first produced.

For example, diethylaminoethoxypropionitrile is prepared according to the following equation:

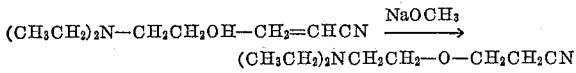

This product is then reduced in the presence of absolute alcohol, using 1,300 pounds hydrogen pressure and a Raney nickel catalyst.

Among the products produced will be diethylaminoethoxypropylamine and di-(diethylaminoethoxypropyl)-amine.

The resulting mixture of ether-amines can be used as such or can be separated into their component parts by distillation. It has been found that the nitrogen atoms should be separated from each other by alkoxy groups being positioned between the amide forming nitrogen and the salt forming nitrogen.

Desirably, this basic compound is then reacted with two or three mols of high molecular weight fatty acid having 8 to 22 carbon atoms to amidize the reactive nitrogen group and to form fatty acid salts with one or more of the salt forming tertiary nitrogen groups.

It has been found that these fatty acid compounds of the above basic materials are highly soluble in asphalt and asphalt solvents and have a high heat stability and will give unusual wetting and anti-stripping properties.

These effects appear to be due to polyamino alkoxy aliphatic compounds with amide forming nitrogen groups and terminal salt forming nitrogen groups.

The nitrogen groups may be closer to one end of the chain or the other, but it is important that the ratio of tertiary to amide forming nitrogen groups be at least one to one or two to one.

It has been found that the end alkyl groups may be methyl, ethyl, propyl or butyl while the fatty acid groups may be stearic, palmitic, oleic, ricinoleic, or the fatty acid groups derived from tall oil, soya oil or tallow.

It is also possible to employ naphthenic acid sebacic acid and/or crude tall oil compositions.

From ¼% to 2% of these compounds have been found to have unusually high wetting and anti-stripping properties with widely varying aggregate with varying acidities or basicities, and they may be added directly to the asphalt compositions or emulsions without diluents and they are highly compatible.

They have unusual surfactant properties and appear to form a lasting bond between surfaces of a wide variety of aggregate and the asphalt, tar or other mastic materials.

These compounds have the formula:

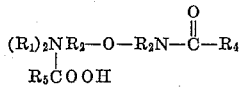

where R$_1$, R$_2$ and R$_3$ are alkyl groups having 1 to 4 carbon atoms, and R$_4$ and R$_5$ are alkyl groups having 8 to 22 carbon atoms, said reaction product being formed by heating the mixture of the fatty acids and the amine up to about 300 to 450° F. for from four to five hours and removing any water generated.

*Example 1*

One mol of dimethylaminoethoxypropyl amine and two mols of tall oil fatty acids (containing 45% rosin acids or abietic acid) are placed in a two liter three neck flask equipped with an agitator, thermometer, Stark-Dean water trap and condenser.

The mixture is heated slowly to 300° F. in a period of one hour at which time water appears in the Stark-Dean trap. The temperature is raised to 420° F. over a two hour period, and then held at this temperature for an additional two hours.

At the end of this period of time, 19 ml. of water collects in the trap.

The product is a brown viscous oil, soluble in alcohol, kerosene and xylol.

The compound produced will have the formula: N-[3-($\beta$ - dimethylaminoethoxy)propyl]tallamide, abietic acid salt.

*Example 2*

One mol of diethylaminoethoxypropyl amine and two mols of tallow fatty acids are reacted as in Example 1, except that the temperature is raised to 450° F.

Eighteen ml. of water was collected in the water trap plus 3 ml. of oily matter.

The resulting product was a tan solid easily soluble in alcohol, kerosene and aromatic solvents.

*Example 3*

One mol di-(diethylaminoethoxypropyl) amine and three mols of crude tall oil are placed in a three neck two liter flask equipped with thermometer, agitator, water trap and condenser.

The mixture is heated to 400° F. in two hours and held at this temperature an additional three hours. One mol (18 ml.) of water was recovered from the water trap plus 4 ml. of an oily substance which apparently distilled over at this temperature.

The resulting compound was a dark brown semi-solid with an acrid tall oil odor.

The compound was soluble in alcohol, kerosene and xylol.

The above prepared compounds were evaluated for their wetting and anti-stripping properties as follows:

One gram of each of the above compounds was added to 100 grams of MC-3 asphalt which was previously heated to 150° F.

The asphalt containing 1 gram of additive was then placed in an 8-ounce friction lid can and placed in a constant temperature oven heated to 325° F. and kept at this temperature for 72 hours.

At the end of this heating period, the cans were removed from the oven and allowed to cool to room temperature.

A blank of MC-3 asphalt was heated in the same manner.

One hundred grams each of Massachusetts rhyolite, Virginia limestone and Rhode Island trap rock (¼ to ½ inch size) aggregate were each wetted with 2 ml. water. To the water wetted aggregate was added six grams of the treated asphalt above noted and the mixture thoroughly stirred for three minutes.

The aggregrate treated with the MC-3 containing the additives from Examples 1, 2 and 3 coated the aggregate surfaces at least 95% whereas the blank (untreated MC-3 asphalt) failed the test with only 25% surface coating.

The coated aggregate from the above test was then cured at 140° F. for one hour at which time the cured mix was placed in distilled water for 18 hours at room temperature. The bituminous mixes containing the additives all passed 95% coating test whereas the untreated asphalt mixes were completely stripped.

The preferred fatty acid groupings are the tall oil fatty acids, but less preferably, there can be dimerized fatty acids, naphthene acids and castor oil still bottom fatty acids.

The preferred tall oil fatty acids includes as the major fatty acid constituents abietic acid, oleic acid and linoleic acid.

The present application is a continuous-in-part of application Serial No. 680,656, filed August 28, 1957, now Patent No. 3,047,414.

Having now particularly described and ascertained the nature of the invention, and in what manner the same is to be performed, what is claimed is:

1. A heat stable asphalt additive having stable anti-stripping properties at elevated temperatures of 250° to 400° F. and composed of the reaction product of one to three mols of fatty acids containing 8 to 22 carbon atoms with one mol of dialkylaminoalkoxyalkyl amine, said reaction product being formed by heating the mixture of the fatty acids and the amine up to about 300 to 450° F. for from four to five hours and removing any water generated, the alkyl groups containing 1 to 4 carbon atoms.

2. A heat stable asphalt additive having stable anti-stripping properties at elevated temperatures of 250° to 400° F. and composed of the condensation product of one to three mols of fatty acids containing 8 to 22 carbon atoms with one mol of di-(dialkylaminoalkoxyalkyl) amine, said reaction product being formed by heating the mixture of the fatty acids and the amine up to about 300 to 450° F. for from four to five hours and removing any water generated, the alkyl groups containing 1 to 4 carbon atoms.

3. A heat stabilized asphalt coated aggregate for paving a road building which will withstand elevated temperatures ranging from 250° to 450° F. with undiminished high wetting and anti-stripping properties which asphalt composition contains ½% to 2% of:

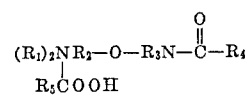

where $R_1$, $R_2$ and $R_3$ are alkyl groups having 1 to 4 carbon atoms, and $R_4$ and $R_5$ are alkyl groups having 8 to 22 carbon atoms, said reaction product being formed by heating the mixture of the fatty acids and the amine up to about 300 to 450° F. for from four to five hours and removing any water generated.

4. A heat stabilized asphalt coated aggregate for paving a road building which will withstand elevated temperatures ranging from 250° to 450° F. with undiminished high wetting and anti-stripping properties which asphalt composition contains from ½% to 2% of: N-[3-($\beta$-dimethylaminoethoxy)propyl]tallamide, abietic acid salt.

5. A condensation product of tall oil fatty acids containing from 20% to 50% abietic acid and aliphatic substituted polyamines consisting of a mixture of dimethylaminoethoxypropyl amine and di-(dimethylaminoethoxypropyl) amine, said reaction product being formed by heating the mixture of the fatty acids and the amine up to about 300 to 450° F. for from four to five hours and removing any water generated.

6. A paving composition of improved adhesion and weathering qualities consisting essentially of a bituminous material containing from ½% to 2% of the additive having stable anti-stripping properties at elevated temperatures of 250° to 400° F. and of claim 1, said reaction product being formed by heating the mixture of the fatty acids and the amine up to about 300 to 450° F. for from four to five hours and removing any water generated, the alkyl groups containing 1 to 4 carbon atoms.

7. A paving composition of improved adhesion and weathering qualities consisting essentially of a bituminous material containing from ½% to 2% of the additive having stable anti-stripping properties at elevated temperatures of 250° to 400° F. and of claim 5, said reaction product being formed by heating the mixture of the fatty acids and the amine up to about 300 to 450° F. for from four to five hours and removing any water generated.

8. A heat stabilized asphalt coated aggregate for paving a road building which will withstand elevated temperatures ranging from 250° to 450° F. with undiminished high wetting and anti-stripping properties which asphalt composition contains ½% to 2% of an additive having stable anti-stripping properties at elevated temperatures of 250° to 400° F. and consisting of the condensation product of one mol di-(diethylaminoethoxypropyl) amine and three mols of crude tall oil which has been heated to 400° F. in two hours and held at this temperature an additional three hours and which additive consists of a dark brown semi-solid with an acrid tall oil odor and is soluble in alcohol, kerosene and xylol.

9. The method of enhancing the wetting and anti-stripping properties of asphalt compositions which comprises adding thereto ½ to 2% of an additive having stable anti-stripping properties at elevated temperatures of 250° to 400° F. and consisting of the condensation product of one mol of dimethylaminoethoxypropyl amine and two mols of tall oil fatty acids (containing 45% resin acids) heated slowly to 300° F. in a period of one hour following which the temperature is raised to 420° F. over a two hour period, and then held at this temperature for an additional two hours, the additive consisting of brown viscous oil, soluble in alcohol, kerosene and xylol.

10. A siliceous aggregate coated with a heat stable asphalt retaining its covering power at elevated temperature up to 250° to 400° F. containing one-half to 2% of an additive with terminal amide and tertiary nitrogen fatty acid salts having the specific formula N-[3-(β-dimethylaminoethoxy)propyl]tallamide, abietic acid salt.

11. A siliceous aggregate coated with a heat stable asphalt retaining its covering power at elevated temperatures up to 250° to 400° F. containing one-half to 2% of an additive with terminal amide and tertiary nitrogen fatty acid salts of the general formula

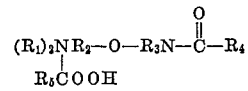

where $R_1$, $R_2$ and $R_3$ are alkyl groups having 1 to 4 carbon atoms, and $R_4$ and $R_5$ are alkyl groups having 8 to 22 carbon atoms, said reaction product being formed by heating the mixture of the fatty acids and the amine up to about 300 to 450° F. for from four to five hours and removing any water generated.

References Cited in the file of this patent
UNITED STATES PATENTS

| | | |
|---|---|---|
| 2,679,462 | Monson | May 25, 1954 |
| 2,737,509 | Jelling | Mar. 6, 1956 |